United States Patent

Townsend et al.

[11] 3,905,858
[45] Sept. 16, 1975

[54] APPARATUS FOR PREPARING STRIPED SHEET MATERIAL CONTINUOUSLY

[75] Inventors: John K. Townsend, Torrance; Chester E. Sanford, Lomita, both of Calif.

[73] Assignee: Vistron Corporation, Cleveland, Ohio

[22] Filed: Jan. 23, 1974

[21] Appl. No.: 435,739

Related U.S. Application Data

[63] Continuation-in-part of Ser. No. 221,311, Jan. 27, 1972, which is a continuation-in-part of Ser. No. 37,172, May 14, 1970, Pat. No. 3,716,431, which is a continuation-in-part of Ser. No. 695,448, Jan. 3, 1968, abandoned.

[52] U.S. Cl. ............. 156/436; 118/412; 156/62.2; 156/179; 156/276; 156/500; 264/73; 264/112; 264/245

[51] Int. Cl.².... B32B 5/00; B32B 31/00; B29J 5/00

[58] Field of Search .............. 156/62.2–62.8, 156/65, 84, 85, 161, 166, 176–179, 196, 200, 205, 240, 242–246, 276, 277, 295, 384, 390, 436, 461, 462, 500, 501, 508, 547, 548; 118/411–415; 264/73–77, 245–247, 112; 425/97, 98, 219, 223, 224

[56] References Cited

UNITED STATES PATENTS

| | | | |
|---|---|---|---|
| 2,406,801 | 9/1946 | Byers | 156/62.2 |
| 2,573,952 | 11/1951 | Bretherton | 118/412 |
| 2,927,623 | 3/1960 | Huisman et al. | 156/179 |
| 3,077,000 | 2/1963 | Huisman et al. | 156/205 |
| 3,109,763 | 11/1963 | Finger | 156/276 |
| 3,540,964 | 11/1970 | Nauta | 156/244 |
| 3,630,802 | 12/1971 | Dettling | 156/500 |
| 3,639,202 | 2/1972 | Simon | 156/62.2 |
| 3,657,032 | 4/1972 | Watanabe et al. | 156/62.4 |
| 3,665,890 | 5/1972 | Mishler | 118/412 |

OTHER PUBLICATIONS

Bell, Charles, How to Build Fiberglass Boats, Coward-McCann, Inc. (1957), pp. 49–51, and 132 relied on.

*Primary Examiner*—Clifton B. Cosby
*Assistant Examiner*—John E. Kittle
*Attorney, Agent, or Firm*—John F. Jones; Sherman J. Kemmer

[57] ABSTRACT

A process and apparatus are provided for the continuous manufacture of novel, fiber-reinforced, thermoset plastic sheet material having longitudinal, substantially parallel colored or pigmented stripes as an integral part of the sheet material.

1 Claim, 16 Drawing Figures

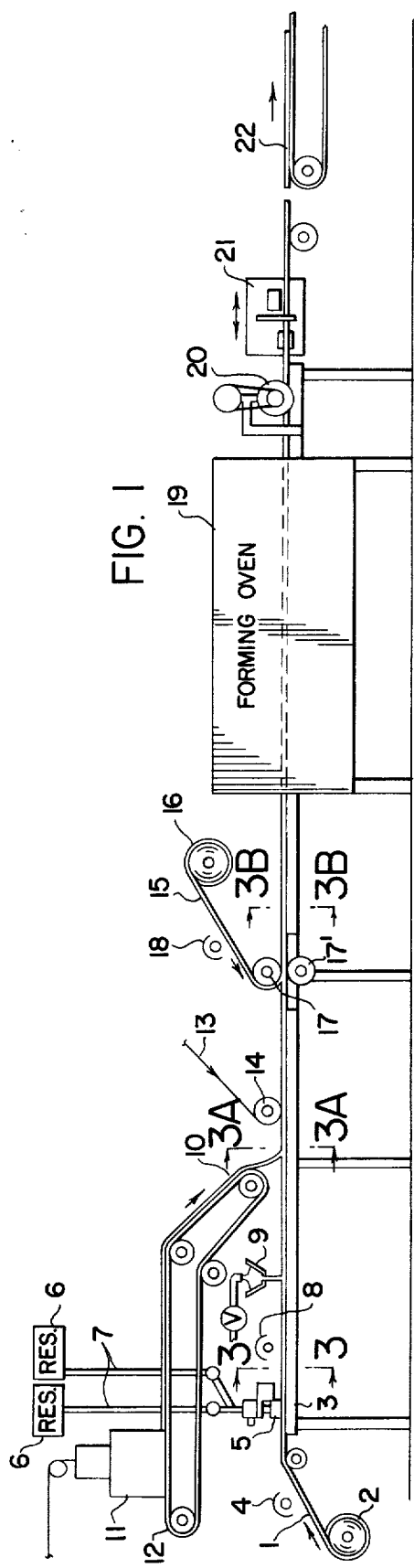
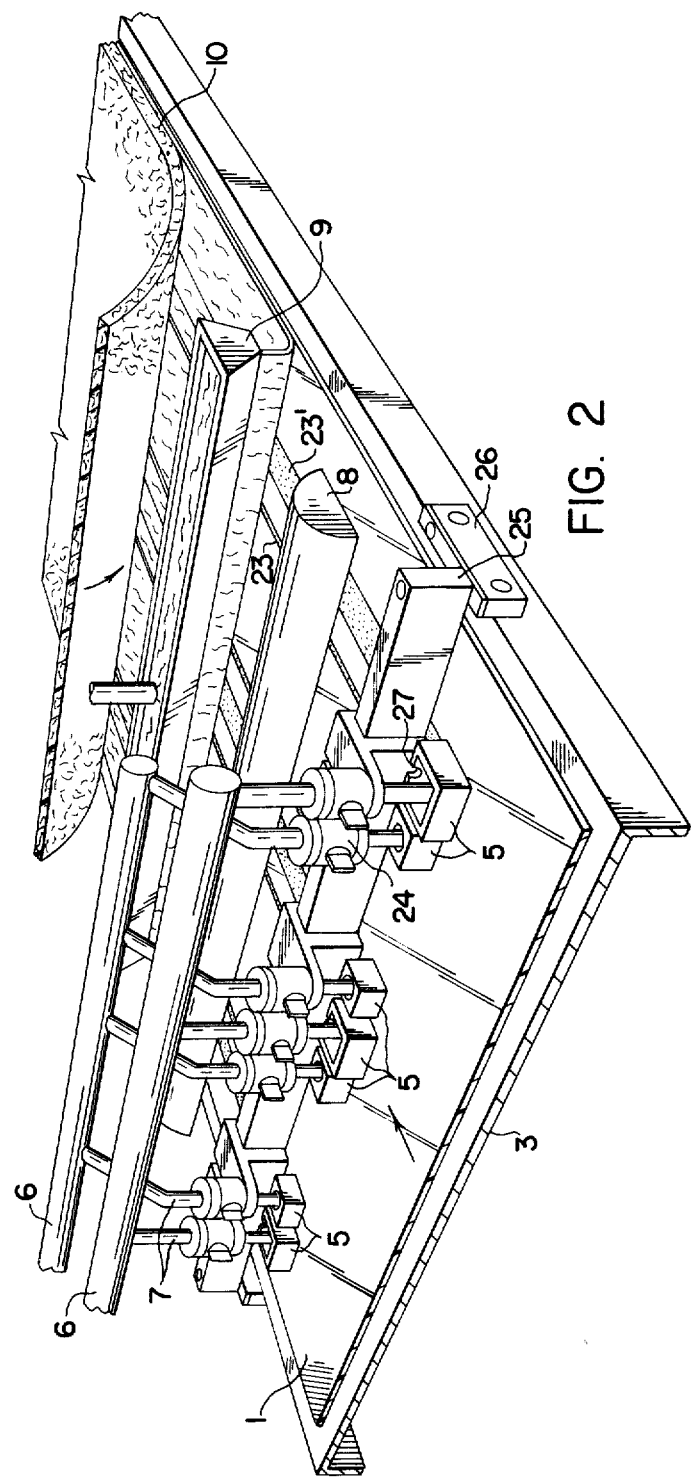
FIG. 1
FIG. 2

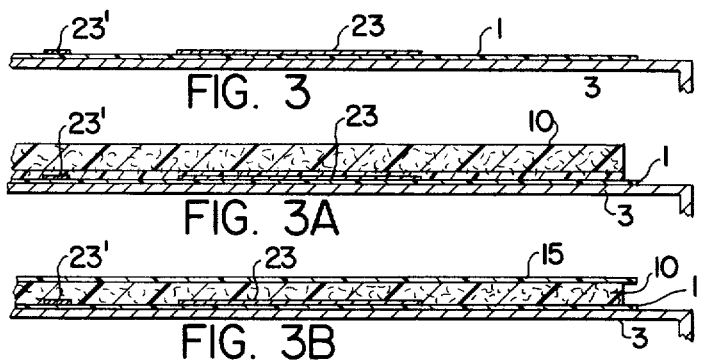
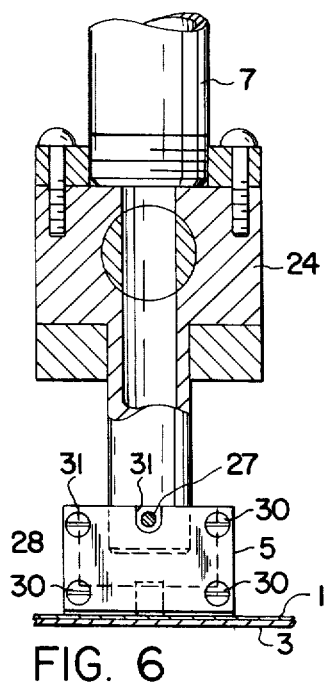
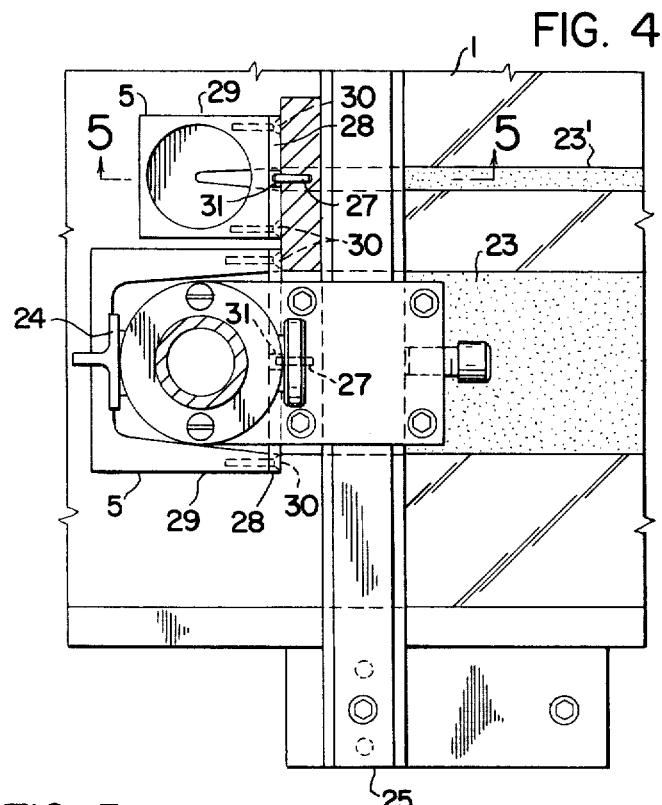
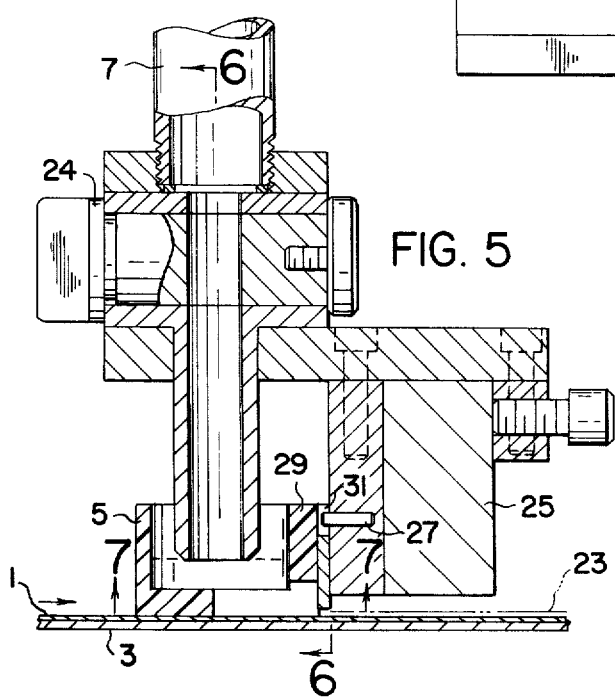

APPARATUS FOR PREPARING STRIPED SHEET MATERIAL CONTINUOUSLY

This is a c-i-p application of our co-pending U.S. Pat. application Ser. No. 221,311 filed Jan. 27, 1972, which in turn is a continuation-in-part application of our co-pending application Ser. No. 37,172 filed May 14, 1970, now U.S. Pat. No. 3,716,431, which in turn is a continuation-in-part application of our abandoned application Ser. No. 695,448 filed Jan. 3, 1968.

This invention relates to an apparatus and process for continuously producing striped sheet material and more particularly pertains to the apparatus and continuous process for the manufacture of plastic sheet material having substantially parallel stripes of a wide variety of shapes and colors and various combinations of same. The present invention is particularly adaptable to the production of thermosetting plastic sheet material having an integral, substantially parallel colored stripe or stripes. The thermoset plastic sheet produced by this process can be and preferably is reinforced with fibers and can be either opaque or translucent with either opaque or translucent colored stripes. The stripes produced in this invention are always narrower than the width of the plastic sheet material and will contrast in appearance with the sheet in at least one respect in regard to color, translucency, or opaqueness, etc. The stripes, when there are more than one in a sheet, may be the same or different in color, transluency, etc.

According to the present invention, striped sheets or plates comprising a polymeric resin are produced continuously by a process wherein a curable synthetic resin which may be in the form of a liquid or paste containing one or more polymerizable or curable monomeric compounds is passed between moving surfaces which are substantially parallel in the direction of the movement and have substantially no relative motion, and the monomeric constituents of said liquid or paste are polymerized between said surfaces by the action of heat, light, or other type of radiant energy, with or without the application of pressure.

The continuous production of sheet material, and particularly plastic sheet material, is described in U.S. Pat. No. 2,784,763, for instance. In this prior art process a composite sheet material is produced by moving longitudinally a lower surface film or web, depositing on this web a heat settable liquid resin, placing in the liquid resin stranded reinforcing material, displacing the air in the reinforcing material with liquid resin, then covering the mixture of liquid resin and reinforcing material with an upper film or web, applying pressure to the upper web and lower web to consolidate the mixture of liquid resin and reinforcing material and thus forming a composite sheet, moving the composite sheet longitudinally through a heating zone causing the resin to set and during the movement through said heating zone engaging the opposite surfaces of the composite sheet and shaping it into a desired form in a longitudinal direction.

U.S. Pat. No. 2,927,623 describes an apparatus for continuously producing a composite sheet of reinforced plastic material. The apparatus of this patent operates by feeding through the machine a carrier surface sheet of cellulose film such as cellophane onto which a measured quantity of settable resin in liquid form is deposited and spread evenly with a doctor blade. The edge portions of the sheet are raised so as to confine the resin to the central portion of the sheet. Chopped strands of fibrous material are fed into the resin and simultaneously compacted and pressed into the resin by a plurality of threads extending lengthwise of the sheet. As the loose fiber is held compacted by such threads, a cover surface sheet is laid on the resin and fiber mixture, the opposite edges of the surface film are glued together to form a flat tube containing the resin and fiber mixture, and such composite sheet is passed between rolls to squeeze out the air and establish the thickness of the sheet. The sheet thus formed is then passed through slots of fixed width during setting of the resin, which preferably is expedited by passing the sheets through an oven. After the resin has set, the longitudinal edges of the continuous sheet may be trimmed, and the sheet which is composed of chopped strands of fibrous material such as glass fiber embedded in a matrix of cured synthetic resin cut into desired lengths.

U.S. Pat. No. 3,077,000 describes an improvement for preparing longitudinally contoured sheet material described in U.S. Pat. No. 2,784,763, comprising an apparatus for providing transversely contoured, continuously formed sheet material.

Lines, stripes and different designs have been placed upon sheet objects by stencils, printing and various other means. There are some materials upon which printing is unsatisfactory and stencils are not adaptable. Patterns can be painted or otherwise coated onto the surface of a panel after the panel is produced but such a process is an expensive additional operation and usually produces a pattern which can easily be worn or chipped off the panel. Panels can also be made with an inserted paper or other inserted sheet material on which there is a printed pattern. The inserted sheet material is expensive, the process for inserting it is expensive, and lack of complete soaking and integration into the plastic panel permits water absorption and blooming.

It is desirable to provide means whereby colored stripes may readily be placed upon continuously formed sheets of reinforced plastic material by flowing paint, lacquer or the like through restricted openings onto one or both of the upper and lower webs and partially curing the stripe or stripes thus formed before addition of the curable resin and fibers to the sheet forming apparatus.

The primary object of this invention is the provision of a continuous process for producing in an economical manner a decorative pattern within a fiber-reinforced plastic panel to enhance its appearance and architectural usefulness.

It is an object of this invention to provide a method for the continuous production of sheets of polymeric materials having uniform, substantially parallel colored stripes as an integral part of said sheets.

It is a further object to form the striped sheet as it is produced into any desired cross-sectional shape; flat, corrugated, V-crimp channel, arcuate, etc.

Another object is to provide a striping tool in which the size, number, color and arrangement of the stripes may be adjusted readily.

A still further object is to provide an easily assembled striping tool which is of a simple and economical construction.

Our process produces a single or multiple striped pattern created by a dyed or pigmented resin system, which pattern is chemically bonded with the panel resin and is integral within the panel. This pattern cannot be chipped off the panel, nor will it flake off because it is an integral part of the panel. Internal blooming or separation of the pattern cannot occur.

The first step in our striping process is that of depositing a coating of a definite controlled thickness and specific controlled width or, stated differently, a coating of predetermined and substantially unvarying thickness and width onto the carrier sheet and/or the cover sheet such that it forms a stripe longitudinally with the panel. A plurality of such stripes can be used to form a variety of geometric patterns in the finished panel. Special stripers deposit the initial coating on the carrier sheet. These stripers are fabricated or machined to incorporate side-retention means as well as metering or doctoring means within a single unit.

The striper is provided for applying a stripe of a liquid material, supplied from a liquid source, onto a web member having relative movement in a predetermined direction with respect to a web-engaging surface of the striper comprising a body member formed with a passageway or orifice therethrough connected at one end to the source of liquid, the body member being also formed on the web-engaging surface with a flat surface projecting from the body member and engageable with the web, preferably the flat surface being wider at the trailing edge than at the leading edge thereof with respect to the direction of relative movement of the web and applicator to prevent or minimize transverse leakage of the liquid material.

The thickness of the stripe applied from each orifice depends primarily upon the setting and width of the doctoring blade, viscosity of the liquid stripe material, and the speed of the web. An illustrative doctor blade setting is one that would provide a gap of between 0.001–0.10 inch, through which the liquid stripe material flows.

The device may be mounted in any suitable manner, and material may be passed under it or it may be passed over the material, and the openings may be of any size or width or any number of openings may be used.

The general characteristics of the apparatus and process of the present invention will be further illustrated in the accompanying drawings wherein:

FIG. 1 is a side elevation view of the apparatus according to this invention.

FIG. 2 is a top perspective view, partly in section, of part of the apparatus.

FIG. 3 is a sectional view taken along line 3—3 of FIG. 1.

FIG. 3A is a sectional view taken on line 3A—3A of FIG. 1.

FIG. 3B is a sectional view taken on line 3B—3B of FIG. 1.

FIG. 4 is a top plan view of a portion of the apparatus showing two stripers and stripes produced thereby.

FIG. 5 is a view taken on line 5—5 of FIG. 4.

FIG. 6 is an end elevation view, partly in section, taken on line 6—6 of FIG. 5.

Figure 7:
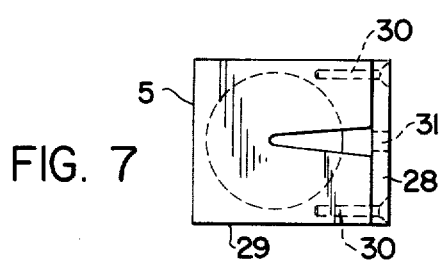
FIG. 7 is a top plan view of one striper embodied in this invention.

FIG. 1 is a cross-sectional over-all view of the striping and panel-forming apparatus including the lower carrier sheet 1 which is unrolled from roll 2 and travels in a plane along table 3. The carrier sheet may be paper or a plastic of a character which may be stripped from the finished composite sheet and conveniently may be a cellulose film such as cellophane. If the surface carrier sheet material is shrunk by heat as cellophane is, it can be passed through a heating zone before material is placed on it. In this zone heat may be supplied by lamps 4 of the infrared type. On the forward moving lower carrier sheet 1 a stripe of colored liquid curable material is continuously deposited from at least one striper. The colored liquid stripe is preferably composed of a dye- or pigment-containing liquid, heat curable liquid or paste of controlled viscosity which is continuously fed to the striper 5 from a reservoir 6 through a conduit 7. A typical liquid stripe material is made up of 70 parts by weight of neopentyl glycol-orthophthalic-maleic polyester compounded with styrene, butyl methacrylate and ultraviolet absorber, 30 parts by weight of propylene glycol-orthophthalic-maleic polyester compounded with styrene and ultraviolet absorber and modified to reduce sensitivity to air inhibition on curing, 8 parts by weight of a plasticizer, 1 part of silica aerogel, 1 part silicone resin, 4–9 parts pigment, 0.4 part t-butyl perbenzoate and 0.3 part methyl ethyl ketone peroxide. The colored stripe is then at least partially cured with a heat curing means such as an infrared heater 8 so that it becomes insoluble and no longer will flow. It is necessary in this step to gel the stripe material enough so that it will not intermix and flow when it contacts the basic panel resin and preferably the stripe material is not completely cured until it is co-cured with the basic panel resin. Next there is deposited on the forwardly moving carrier 1 from a spreading means such as a trough 9 a measured quantity of polymerizable resin such as a liquid unsaturated polyester composition. A typical liquid polyester is composed of 100 parts by weight of propylene glycol-orthophthalic-maleic polyester, compounded with styrene and methyl methacrylate monomers and an ultraviolet absorber, 10 parts of hydrated aluminum oxide, 0.75 part of titanium dioxide, 0.9 part of benzoyl peroxide and 0.3 part of cumene hydroperoxide. The fibrous reinforcing component of the plastic sheet can be a continuous web of fibers 10 such as that prepared by continuously chopping glass fibers and randomly depositing them on an endless belt in a plenum chamber 11 as is well known in the art. The fiber mat 10 is drawn by the belt 12 and is usually in the form of a loose stack which is distributed uniformaly across the width of the belt and distributed onto the layer of resin and stripe being carried by the lower sheet 1. If desired, tensioning threads 13 as more fully described in U.S. Pat. No. 2,927,623 may be used and are drawn by roller 14 over the upper side of the pile of fibers carried by sheet 1 to press the fibers down into the liquid polyester to a uniform thickness. A cover sheet or web 15 which is preferably of the same material as carrier sheet 1 is dispensed from a roll 16 between pinch rolls 17 and 17' and can be preheated by heating means such as an infrared lamp 18. Stripes may be deposited on the cover sheet 15 by employing the apparatus and procedure just described for doing this on the carrier sheet 1. Thus, stripes can be deposited on either carrier sheet 1, cover sheet 15, or both; and when stripes are produced on both, they may be arranged in or out of register in the final cured sheet material. The surface of the web 15 becomes the under surface of the cover sheet as it passes between pinch rolls 17 and 17'. Means are used to squeeze the air from the composite sheet structure thus formed as is more fully described in U.S. Pat. No. 2,927,623. The composite sheet, composed of a flattened tube of the two edge-sealed surface sheets containing the fibers, resin and threads, passes through a forming oven 19 where it is formed and cured. During its passage through the oven the sheet may be formed into a cross-sectional shape of any desired shape. This operation can be carried out by passing the sheet between forming members or dies as is more fully described in U.S. Pat. No. 2,927,623. When the finished composite sheet emerges from the oven it may be cut to the desired width by edge trim saws 20 and to the desired length by a travelling saw 21 after which the several sheet sections 22 are conveyed to a stacking area. If desired, means also may be provided after oven 19 for stripping the carrier and cover sheets from the finished composite sheet said sheet having the glass fibers disposed beneath the surface of the cured synthetic resin matrix. Forward movement of the sheet material through the apparatus of FIG. 1 is effected slowly and uniformly by cooperating endless tracks, endless tread belts, draw rolls or other pulling means well known to those skilled in the art and more fully described in U.S. Pat. No. 2,784,763. The pulling means is preferably located between the saws 20 and 21.

FIG. 2 is a top perspective view showing somewhat diagrammatically the apparatus for initially forming the stripes and forming the composite sheet, parts being broken away. The stripers 5 float on the lower carrier sheet 1 as the carrier sheet passes over the smooth, flat table surface 3. The flow of liquid striping material from the reservior 6 to the cavity in striper 5 can be controlled by a metering valve means 24. The stripers 5 are restrained from longitudinal movement by a suitable bar 25 which is secured at each of its ends to the sides of the table 3 by means of a bracket 26. The transverse position of the stripers is determined by locating pins 27 on the bar 25. The locating pins 27 can be adjusted to any desired position along bar 25.

In FIG. 3, which is a sectional view taken on line 3—3 in FIG. 1, the wide stripe 23 and narrower or pin stripe 23' are deposited on the lower carrier sheet 1 and are not yet cured by heat but are sufficiently viscous to hold their shape.

In FIG. 3A, which is a sectional view taken along line 3A—3A in FIG. 1, the partially cured stripes 23 and 23' appear between carrier web 1 and the continuous web of fibers 10.

In FIG. 3B which is a sectional view taken along line 3B—3B in FIG. 1, the partially cured stripes 23 and 23' have now become an integral part of the uncured composite sheet composed of lower carrier web 1, the stripes 23 and 23', the continuous web of fibers 10, impregnated with the liquid polymerizable polyester and covered by cover sheet or upper web 15.

The stripe process is carried out by depositing a coating of a definite controlled thickness and specific controlled width onto the lower carrier sheet or upper cover sheet, or both, so that a longitudinal stripe is continuously formed on the sheet. A plurality of stripes can be used to form any variety of geometric patterns in the sheet.

FIG. 4 is a top fragmentary view of the striper assembly showing the bar 25 with locating pins 27 to which are attached two stripers 5 and above one striper is shown in position the metering valve means 24 for supplying the liquid striping material to the striper. The stripes 23 and 23' are shown being produced on the lower carrier material 1.

In FIG. 5, which is a sectional view taken along lines 5—5 of FIG. 4, is shown the conduit 7 from the reservior to provide liquid striping material through metering valve 24 to the striper 5 to continuously deposit stripes on the lower carrier material 1.

FIG. 6 is a sectional view taken along line 6—6 in FIG. 5.

FIG. 7 is a sectional view of a striper taken along line 7—7 in FIG. 5.

Figure 8:
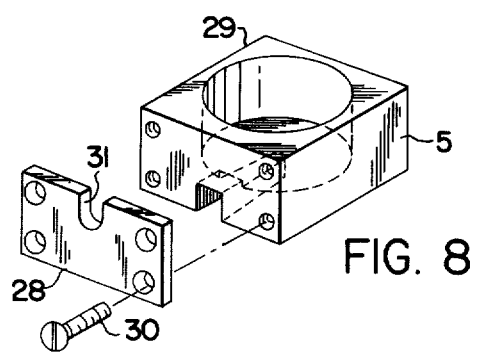
FIG. 8 is an exploded perspective view of the striper of FIG. 7.

FIG. 8 shows a disassembled preferred pin striper composed of a face plate 28 with lower slightly raised knife coating edge, preferably made of a metal which can be mounted to the body portion 29 of the striper, by means of pins or screws 30. The face plate 28 contains a groove 31 which mates with locating pin 27 when the striper is properly mounted and secured to bar 25. The body portion of the striper assembly which is the carrier material contacting portion of the striper 5 may be made of metal or plastic and preferably of a self-lubricating type of plastic such as nylon or a metal filled nylon material.

Figure 9:
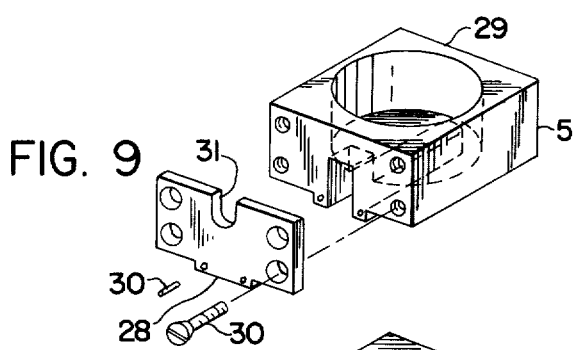
FIG. 9 is an exploded perspective view of another striper useful in this invention.

FIG. 9 shows another embodiment of the disassembled striper construction.

Figure 10:
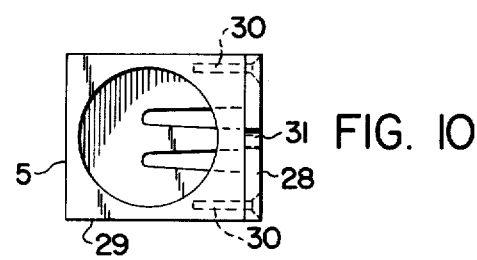
FIG. 10 is a top plan view of a striper which produces a double pin stripe when employed in the apparatus of the present invention.

FIG. 10 is a top view of a double pin striper.

Figure 11:
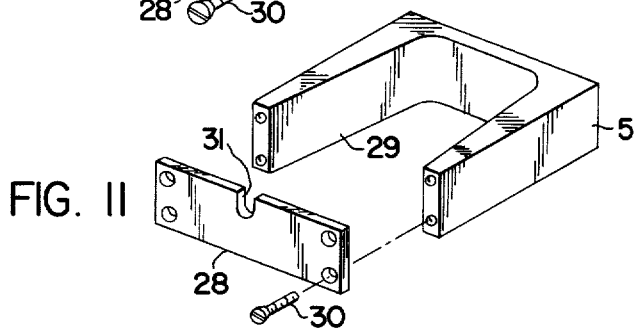
FIG. 11 is an exploded perspective view of a striper which produces a single wide stripe when employed in the apparatus of this invention.

FIG. 11 shows another embodiment of a disassembled striper, preferably one used for making wide stripes.

Figure 12:
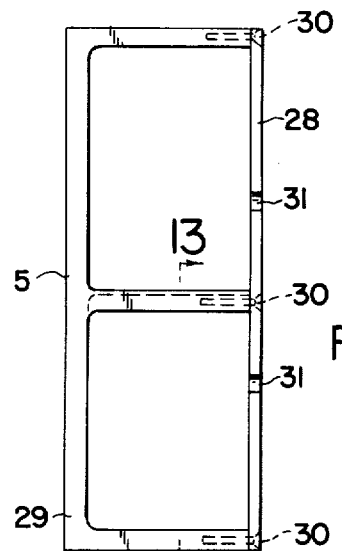
FIG. 12 is a top plan view of another striper which produces two wide stripes when employed in the apparatus of this invention.

FIG. 12 is a top view of a double wide striper having two compartments for liquid striping material separated by a fine divider. Such a striper can be used to produce adjacent parallel wide stripes of more than one color. The adjacent multicolor stripes produced by this striper do not have an unstriped area between them.

Figure 13:
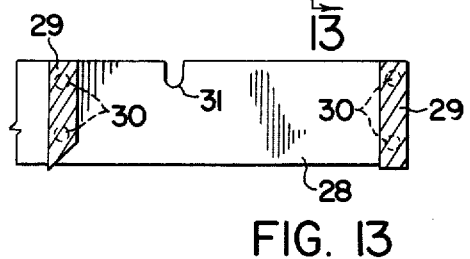
FIG. 13 is a sectional view taken on line 13—13 in FIG. 12.

FIG. 13 is a sectional veiw taken on line 13—13 of FIG. 12 showing the inside of the face plate 28 and illustrating the thin compartment divider and the uniform small space or gap under the knife edge of the face plate 28 of the striper 5 through which the liquid striping material flows to form the stripes of this invention. Although this particular device is shown with two grooves 31 only one is required or more than two can be used if desired.

Figure 14:
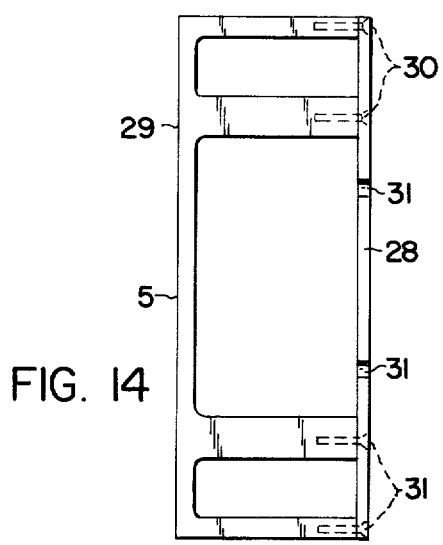
FIG. 14 is a top plan view of another striper which produces a middle wide stripe and two narrower side stripes when employed in the apparatus of this invention.

FIG. 14 is a top view of a single striper assembly constructed so as to produce three stripes of more than one width at one time. If desired, the compartment dividers of this striper can have horizontal hollow passageways to permit liquid striping material to flow between the primary wide striping area or cavity to the two narrower striping areas where three stripes of a single color are desired.

It will be understood that other changes may be made without departing from the spirit of the invention. One of such changes may be in the use of slots or openings of any other shape or design in the stripes. Another may be in the use of any number of these devices in combination to provide different combinations of lines or stripes, and still another may be in the use of two said devices in sequence, with one placing a wide stripe on the material and the other placing one or more stripes on the said wide stripe.

The invention includes the production of striped, fiber-reinforced polyester structures wherein a mixture, consisting essentially of (1) at least one organic linear polymeric ester containing recurring ethylenic unsaturation, (2) at least one addition-polymerizable ethylenically unsaturated organic monomer, and (3) reinforcing fibers, is subjected to additional polymerization conditions effective to produce a striped, cured, fiber-reinforced polyester structure.

Unsaturated polymeric esters suitable for use in the invention for both the sheet forming resin and the stripe material include those prepared by condensing under polymerizing conditions either (1) an ethylenically unsaturated dicarboxylic acid with a diol containing no ethylenic unsaturation or (2) a dicarboxylic acid containing no ethylenic unsaturation with an ethylenically unsaturated diol, or most commonly, (3) a mixture of ethylenically unsaturated dicarboxylic acids and dicarboxylic acids containing no ethylenic unsaturation with a diol containing no ethylenic unsaturation. Stable diacychlorides, diesters or anhydrides of the dicarboxylic acids which are available can be and are often substituted in whole or in part for the acid.

Among the ethylenically unsaturated dicarboxylic acids and derivatives thereof which are commonly employed can be mentioned fumaric acid, maleic acid and its anhydride, citraconic acid, mesaconic acid, itaconic acid and endomethylene tetrahydrophthalic acid. Among the dicarboxylic acids are derivatives thereof containing no ethylenic unsaturation which are commonly employed can be mentioned phthalic acid and its anydride, adipic acid, sebacic acid, isophthalic acid, terephthalic acid, malonic acid and glutaric acid.

A frequently employed ethylenically unsaturated diol is 2-butene-1,4-diol, while among the commonly employed diols containing no ethylenic unsaturation can be mentioned ethylene glycol, propylene glycol, diethylene glycol and dipropylene glycol. As will be obvious to those skilled in the art, varying the proportions and nature of the ethylenically saturated and unsaturated reactants in these condensations affects the number of carbon-to-carbon double bonds in a given polymer chain length available for cross-linking by addition polymerization means.

Among the addition polymerizable compounds most commonly employed as cross-linking agents in combination with the above-described polyesters can be mentioned styrene, diallyl phthalate, methyl methacrylate and triallyl cyanurate. Other ethylenically unsaturated cross-linking agents more or less frequently employed in these operations include alpha-methyl styrene, divinyl benzene, vinyl toluene, allyl diglycolate, methyl acrylate, ethyl acrylate, ethyl methacrylate, vinyl acetate, acrylonitrile, diallyl maleate, vinyl phenol and allyl carbamate. Frequently more than one of the above cross-linking agents is employed in the same mixture, depending on the properties desired in the final structure and its ultimate use. In general their physical characteristics are such that these resins produce a broad, transparent or translucent product by polymerization, but in order to provide toughness and strength, fibrous reinforcing material is preferably embedded in such resins. In a sheet 4 feet wide, 8 feet long and 1/16th of an inch thick, for instance, 30 percent by weight of the sheet can be reinforcing material and 70 percent resin, although the proportions of resin and fiber can be varied considerably.

A polymerization catalyst may be incorporated into the unsaturated polymeric ester of this invention. Suitable polymerization catalysts are peroxides such as benzoyl peroxide, acetyl peroxide, t-butyl peroxide, di-t-butyl peroxide, methyl ethyl ketone peroxide, lauryl peroxide, cumene hydroperoxide, cyclohexane peroxide and the like; azo compounds such as azobisisobutyronitrile and the like. Accelerators or promoters such as cobalt naphthenate, phenyl phosphinic acid, p-toluene sulfonic acid, and some tertiary amines such as dimethyl aniline, are also frequently employed. The polymerization or curing reaction of the monomeric compound can also be initiated by radiant energy such as light, X-rays, or nuclear radiation which may or may not be used in conjunction with chemical initiators and activators which are all well known to those skilled in the art.

The resin preferred for use in the manufacture of sheet material produced by the present process is one of low viscosity which will readily impregnate the reinforcing material and on exposure to heat will set into a hard, dense, infusible state. For transparency a clear, light-stable resin is desirable. For decorative purposes a light colored resin which may be tinted by the addition of pigments or dyes is desirable. For clarity a resin which has an index of refraction closely matching that of the reinforcing material is desirable. All these characteristics may be found in a family of resins called "polyesters" which are well known to be settable by the process of polymerization.

Reinforcing fiber is preferably additionally incorporated into the unsaturated polyester mixture. Any suitable reinforcing fiber may be employed, such as, for example, asbestos, nylon, cellulosic and the like mineral and organic fibers. Glass reinforcing fibers are preferred, particularly from the strength-versus-cost standpoint. Fibrous glass is available for reinforcing structures in the form of cloth, yarns, mats, rovings, milled fibers, parallel strands, surfacing mats and loose fibers. The selection of the particular form in which the glass fibers are to be used and the quantity thereof in proportion to the other ingredients in the mixture permits wide latitude and is a further means of varying the properties of the final structure, in addition to varying the proportions and specific nature of the polyester and cross-linking agents, respectively.

Glass mat is composed of a number of layers of glass fiber bundles, crossing at random and banded loosely together with resin. Glass cloth or other woven fibers may also be used in the apparatus to manufacture reinforced resin sheet.

Fillers such as pigments, clays, mica, silica, talc, etc., can be incorporated into the unsaturated polyester-fiber mixture prior to curing.

The material used for the surface elements or upper and lower carrier webs should be thin, nonporous, inexpensive and sufficiently strong to carry the resin and reinforcing fiber material entirely through the sheet forming apparatus without being ruptured. It has been found that cellulose film, that is cellophane, meets these requirements, although it is entirely feasible to use other materials such as cellulose acetate film, polyvinyl chloride film, vinyl chloride/vinyl acetate copolymer film and polyethylene film, for instance, which like cellophane will part from the set resin sheet, or polyester film and polyvinyl fluoride film more fully described in U.S. Pat. Nos. 3,284,277 and 3,257,266, which will adhere to the resin and become an integral part of the finished sheet imparting weather stability and other desirable properties to the sheet. Endless belts of a material such as stainless steel can be used for surface elements in the process of the present invention.

Stripping or release agents, for instance surface active agents, may be applied to the carrier webs or incorporated into the monomeric compounds to facilitate the separation of the polymerized, finished composite sheet from the moving surfaces.

It will be apparent that the motion of the moving surfaces, while remaining substantially parallel, may, with advantage, be so arranged that the surfaces are brought slightly closer together in passing through the region in which polymerization is taking place. In this way it is possible to follow up the shrinkage of the polymerizing mass, that is the sheet.

During its passage through the oven the sheet may be formed into any desired cross-sectional shape. This forming operation is accomplished by passing the sheet between forming members or dies of complemental contour. Pairs of these members may be located a few feet apart and the width of the members in the direction of travel of the sheet may be of the order of 1 inch. The lower members are fixedly mounted and the upper member of each pair can be raised and lowered by suitable mechanism.

The novel striped sheet material embodied herein is useful in a wide variety of ways, particularly as a material in the construction of walls, room dividers, doors, privacy fences, patio covers, windows, and the like.

It is to be understood, however, that while the invention as herein described is concerned with a continuous length of sheet material that various modifications might be made even to the extent of treating individual pieces of material by the method and essential means shown without departing from the point of the invention.

It is to be understood, also, that while we have herein shown and described particular embodiments of our invention that changes in form and construction may be made within the scope of the appended claims.

We claim:

1. In an apparatus for continuously producing a plastic product of predetermined cross-section, comprising means for providing a moving flexible carrier web, means for depositing curable liquid resin on the carrier web, means for depositing fibrous-reinforcing material onto the liquid resin and lowering the reinforcing material into the liquid resin, means for placing a flexible cover web on the liquid resin and reinforcing material, forming means of predetermined cross-section, means to pull the flexible films with the resin therebetween through the forming means and first curing means disposed adjacent to the forming means to substantially completely cure the resin while it is being moved through said first curing means, the improvement comprising at least one striping member removably and slidably disposed to ride on the moving carrier web and a second curing means ahead of said first means and said means for depositing liquid resin and fibrous-reinforcing material, and means for continuously supplying heat curable colored liquid striping material to said striping member to deposit at least one stripe of predetermined and substantially unvarying thickness and width on the carrier web said second curing means being used to partially cure said deposited striping material

\* \* \* \* \*